(12) United States Patent
Lai et al.

(10) Patent No.: US 12,055,992 B2
(45) Date of Patent: Aug. 6, 2024

(54) SYSTEM AND METHOD FOR POWER SUPPLY INPUT POWER MANAGEMENT

(71) Applicant: Dell Products L.P., Round Rock, TX (US)

(72) Inventors: Yu-Hung Lai, New Taipei (TW); Po-Yun Shih, Taipei (TW); Yi-Che Hsu, Taipei (TW)

(73) Assignee: Dell Products L.P., Round Rock, TX (US)

(*) Notice: Subject to any disclaimer, the term of this patent is extended or adjusted under 35 U.S.C. 154(b) by 178 days.

(21) Appl. No.: 17/722,525

(22) Filed: Apr. 18, 2022

(65) Prior Publication Data

US 2023/0333619 A1    Oct. 19, 2023

(51) Int. Cl.
*G06F 1/30* (2006.01)

(52) U.S. Cl.
CPC ...................... *G06F 1/30* (2013.01)

(58) Field of Classification Search
CPC ........................................................ G06F 1/30
See application file for complete search history.

(56) References Cited

U.S. PATENT DOCUMENTS

| | | | | |
|---|---|---|---|---|
| 6,469,883 B1* | 10/2002 | Zens | ............... | H02H 3/24 361/93.2 |
| 10,145,868 B2* | 12/2018 | Chong | ............... | G01R 17/02 |
| 10,745,023 B2* | 8/2020 | Srivastava | ............... | B60W 50/0225 |
| 2006/0083032 A1* | 4/2006 | McDonald | ........ | H02M 3/33592 363/21.12 |
| 2010/0052623 A1* | 3/2010 | Wang | ............... | H02J 7/0048 320/162 |
| 2014/0266293 A1* | 9/2014 | Ye | ............... | G01R 31/40 324/764.01 |
| 2015/0301126 A1* | 10/2015 | Marchand | ............... | G06F 1/30 324/764.01 |
| 2017/0060668 A1* | 3/2017 | Farhan | ............... | G06F 12/0871 |
| 2017/0185140 A1* | 6/2017 | Bailey | ............... | G06F 1/206 |
| 2018/0032390 A1* | 2/2018 | Rahmanian | ........ | G06F 11/0754 |
| 2019/0121700 A1* | 4/2019 | Alcorn | ............... | G11C 5/141 |
| 2019/0162797 A1* | 5/2019 | An | ............... | G11C 16/349 |
| 2019/0251027 A1* | 8/2019 | Wu | ............... | G06F 12/0804 |
| 2020/0001887 A1* | 1/2020 | Srivastava | ........ | B60W 50/0205 |
| 2021/0012842 A1* | 1/2021 | Ryu | ............... | G11C 5/147 |
| 2021/0070185 A1* | 3/2021 | Liu | ............... | B60L 53/51 |
| 2022/0337166 A1* | 10/2022 | Chan | ............... | H02M 1/007 |

* cited by examiner

*Primary Examiner* — Aurel Prifti
(74) *Attorney, Agent, or Firm* — Womble Bond Dickinson (US) LLP

(57) ABSTRACT

Methods and systems for powering components of a data processing system that may be used to provide computer implemented services are disclosed. The disclosed management method and systems may improve the likelihood of data processing systems providing desired computer implemented services by improving the likelihood that desired power is provided by power supplies. To improve the likelihood of power supplies providing desired power, the power supplies may proactively take into account the type of power being supplied to the power supplies. The power supplies may modify their operation based on the type of input power being supplied to them so that conditioned power may be provided even when changes to the power supplied to the power supplies occur.

20 Claims, 15 Drawing Sheets

SYSTEM AND METHOD FOR POWER SUPPLY INPUT POWER MANAGEMENT

FIELD OF THE DISCLOSURE

Embodiments disclosed herein generally relate to power management. More particularly, embodiments disclosed herein relate to power management in environment where various types of power may be supplied to power supplies.

BACKGROUND

Computing devices may perform computations when providing computer implemented services. For example, computing devices may include any number of hardware devices that may perform computations. To provide the computer implemented services, the computing devices may consume electrical power to perform the computations. The consumed electrical power may generate heat.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
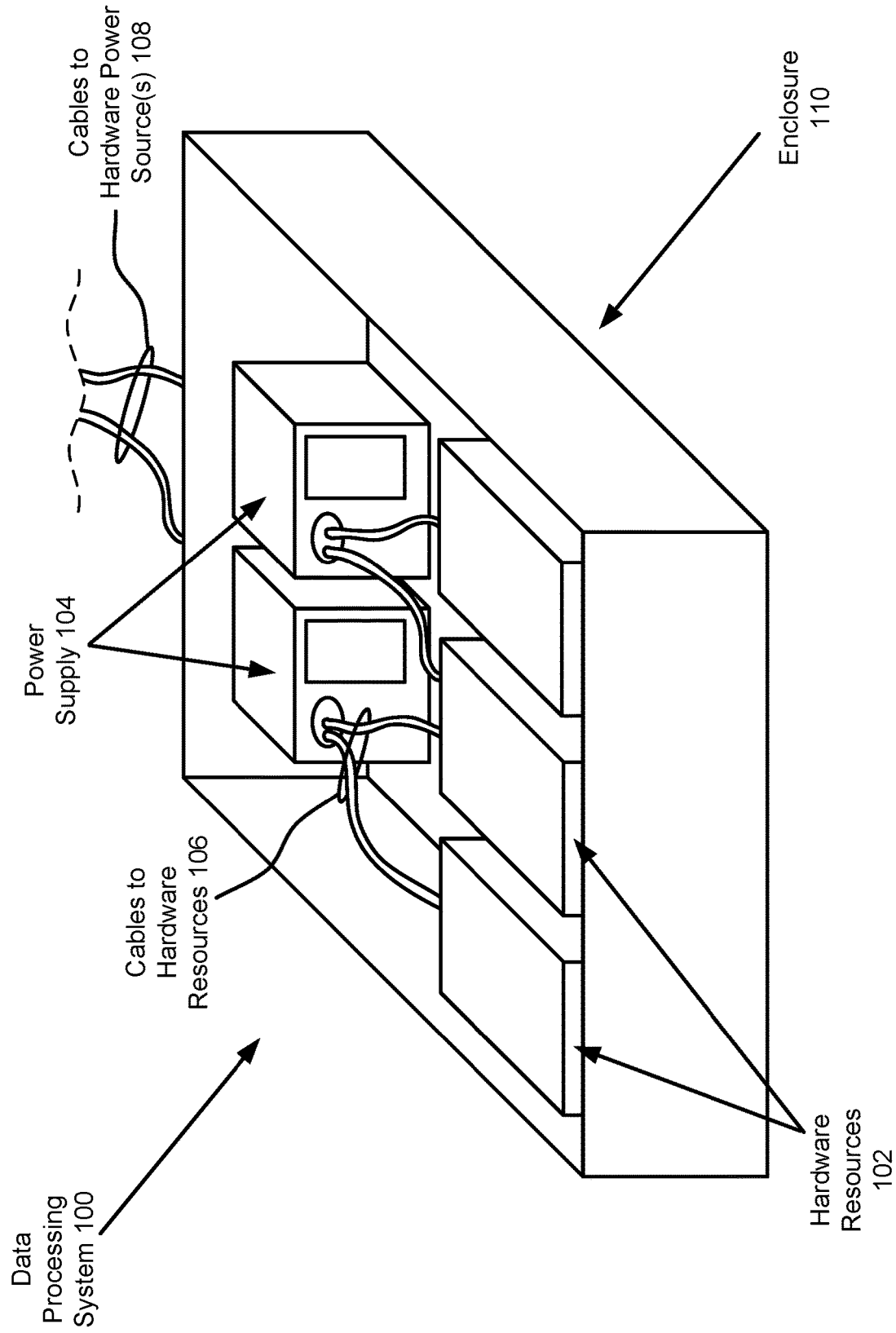
FIG. 1A shows a diagram illustrating a system in accordance with an embodiment.

Various embodiments and aspects of the disclosure will be described with reference to details discussed below, and the accompanying drawings will illustrate the various embodiments. The following description and drawings are illustrative of the embodiments and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

References to an "operable connection" or "operably connected" means that a particular device is able to communicate with one or more other devices, provide power to one or more devices, or otherwise interact with the one or more devices. The devices themselves may be directly connected to one another or may be indirectly connected to one another through any number of intermediary devices, such as in a network topology.

In general, embodiments disclosed herein relate to methods and systems for powering components of a data processing system that may be used to provide computer implemented services. Specifically, the disclosed power management method and systems may improve the likelihood of data processing systems providing desired computer implemented services by improving the likelihood that desired power (e.g., conditioned power) is provided by power supplies.

To improve the likelihood of power supplies providing desired power, the power supplies may proactively identify the power being supplied to them. For example, the power supply may proactively identify whether the power supplies are receiving alternating current, direct current, or are unpowered.

To do so, the power supplies may monitor their input voltage levels over time. The measured voltages over time may be used to ascertain whether power is being supplied to the power supplies or whether the voltage level is being supported by components that are merely discharging (e.g., after being charged due to the supply of power to a power supply). By doing so, the power supplies may identify their true power state which may otherwise be masked due to discharging components. Consequently, the power supplies may be better able to modify their operating states such that received power is properly conditioned and provided to other devices. If the input power is not accurately ascertained, then the power supplies may fail to properly provide conditioned power.

By doing so, data processing systems may be more likely to be able to provide desired computer implemented services (e.g., by making it more likely that components thereof are properly powered), may have a higher up time, and/or may be less expensive to operate (e.g., by virtue of reduced component degradation/replacement due to application of improperly conditioned power).

In an embodiment, a power supply for powering a data processing system comprising hardware resources to provide computer implemented services is provided. The power supply may include an input for receiving power from a power source; a power stage that provides power to the hardware resources; an input capacitor positioned with the input; and a power manager adapted to: identify a power event for the power supply based on monitoring of an input voltage across the input capacitor from the power supply; in response to identifying the power event, identify a type of input power being provided to the power supply based on a sampling of the input voltage across the input capacitor over a period of time; when the type of input power indicates a change in power provided by the power supply: update an operating state of the power supply based on the change in the power provided by the power supply, and perform an action set based on the updated operating state to modify operation of the power supply; and when the type of input power does not indicate the change in power provided by the power supply: maintain the operating state of the power supply.

Identifying the type of input power being provided to the power supply may comprises: identifying a root mean square (RMS) voltage for the input power from the power supply; sampling the voltage for the input power from the power supply over a period of time; identifying a slope of a line connecting the voltage samples over the period of time;

making a determination regarding whether the slope exceeds a threshold; when the slope exceeds the threshold, identifying that the type of input power is unpowered; and when the slope does not exceed the threshold, identifying that the type of input power is alternating current or direct current.

The type of input power may be identified as alternating current when the RMS voltage exceeds a second threshold and the type of input power is identified as direct current when the RMS voltage does not exceed the second threshold.

The threshold may be a negative number.

Identify the type of input power being provided to the power supply may comprise: obtaining a series of samples of a voltage for the input power from the power supply; for each sample of the series of samples, determining whether the respective sample is of a lower value than an immediately preceding sample in the series of samples; and based on the determinations: incrementing a counter when the respective sample is of the lower value than the immediately preceding sample in the series of samples, resetting the counter when the respective sample is of the lower value than the immediately preceding sample in the series of samples, determining that the power type is unpowered when the counter exceeds a threshold, and determining that the power type is direct current or alternating current when the counter does not exceed the threshold and all of the determinations have considered.

The action set may comprise: modifying operation of a power stage of the power supply, the operation of the power supply controlling a type and quantity of processed power provided to the hardware resources.

The action set may comprise: performing a graceful depowering of the hardware resources when the operating state is unpowered.

In an embodiment, a data processing system to provide computer implemented services is provided. The data processing system may include hardware resources used to provide the computer implemented services; and a power supply as discussed above.

In an embodiment, a method of operating hardware resources of a data processing system to provide computer implemented services is provided. The method may include identifying a power event for a power supply that supplies power to the hardware resources, the power event being identified based on monitoring of an input voltage across an input capacitor from the power supply, the power supply receiving power from a power support via the input capacitor; in response to identifying the power event, identifying a type of input power being provided to the power supply based on a sampling of the input voltage across the input capacitor over a period of time; when the type of input power indicates a change in power provided by the power supply: updating an operating state of the power supply based on the change in the power provided by the power supply, and perform an action set based on the updated operating state to modify operation of the power supply; and when the type of input power does not indicate the change in power provided by the power supply: maintaining the operating state of the power supply.

In an embodiment, a non-transitory computer readable medium storing instructions that, when executed by a processor, cause a method is provided. The method may be similar to that discussed above and/or that performed by the power manager.

Turning to FIG. 1A, a diagram illustrating a system in accordance with an embodiment is shown. The system shown in FIG. 1 may be used to provide computer implemented services. The system may include data processing system 100 and enclosure 110. Each of these components is discussed below.

Data processing system 100 may provide the computer implemented services. When doing so, data processing system 100 may consume electrical power from other sources (e.g., via power supply 104 or another device external to the data processing system, either of which may obtain power from a utility or other source). To provide the computer implemented services, data processing system 100 may include hardware resources 102 and power supply 104.

Hardware resources 102 may include any number of physical devices (e.g., processors, memory modules, storage devices, communications devices, etc.) that provide computing resources (e.g., processor cycles, transitory storage, persistent storage, communications bandwidth, etc.) usable to provide the computer implemented services. The computing resources may be used to support applications (e.g., computing instructions executing with the computing resources) hosted by data processing system 100. The applications may provide the computer implemented services. The computer implemented services may include any type and quantity of computer implemented services such as, for example, database services, data storage services, electronic communications services, etc. Data processing system 100 may provide other types of computer implemented services without departing from embodiments disclosed herein.

When operating, hardware resources 102 may consume electrical power to provide the computing resources used to provide the computer implemented services. The hardware resources may utilize power from power supply 104, and/or other sources. Power supply 104 may include any number of physical devices (e.g., transformers, current/voltage sensors, controllers, etc.) usable to obtain power from other power sources (not shown) and provide conditioned power to hardware resources 102 and/or other components. The power obtained from the other power sources may be any form of power (e.g., alternating current, direct current) and may change over time, but the conditioned power provided by power supply 104 may have specific characteristics (e.g., direct current of a predetermined voltage level) based on the hardware resources 102. For example, hardware resources 102 may not operate as expected when hardware resources 102 are provided with power that is not conditioned power.

To obtain power from one or more power sources, power supply 104 may be operably connected to the power sources via cables 108. Similarly, cables 106 may operably connect the power supply 104 to hardware resources 102, thereby allowing conditioned power to be provided to hardware resources.

Power supply 104 may be capable of accepting different types of power from power supplies to provide conditioned power. To do so, power supply 104 may modify its operation depending on the type of power being obtained from power sources. However, the ability to modify its operation may be predicated on power supply 104 being able to accurately determine (i) whether power is being provided by power sources and (ii) when power is being provided to power supply 104, a type of the power (e.g., alternating current, direct current, pulse width modulation, etc.) being provided by the power sources.

In general, embodiments disclosed herein relate to system, methods, and devices for improving the quality of computer implemented services provided by a data processing system. To do so, the system may proactively monitor power being provided to power supply 104 by power sources and modify the operation of power supply 104 based on changes in the supplied power. By doing so, power supply 104 may be more likely to provide desired conditioned power to hardware resources 102 and/or other components.

For example, the power sources that provide power to power supply 104 may modify the type of power being provided from alternating current to direct current. If power supply 104 does not modify that manner in which it is providing conditioning power responsive to this change, power supply 104 may not continue to supply conditioned power.

In another example, cables 108 and/or connections between power supply 104 and the power sources may temporarily become inoperably connected. The resulting inoperable connection between power supply 104 and the power sources may depower power supply 104. If power supply 104 does not modify the manner in which it is operating in response to a transient depowering, power supply 104 may fail to provide conditioned power and/or may fail to gracefully depower the components to which it supplies power.

Further, as will be discussed in greater detail below, a depowering event and a change from alternating current to direct current supplied to power supply 104 based on only on information regarding voltage and current supplied to power supply 104 from the power sources may appear to be similar events.

To manage the process of providing conditioned power, power supply 104 may perform a sampling process to ascertain the type of power (e.g., alternating current, direct current, unpowered) being supplied to it. By sampling voltage levels at its input terminals, power supply 104 may be more likely to correctly deduce the type of power being supplied to it. Consequently, power supply 104 may be more likely to take appropriate action in response to events such as changes in the type of supplied power, or lack thereof.

Figure 1B:
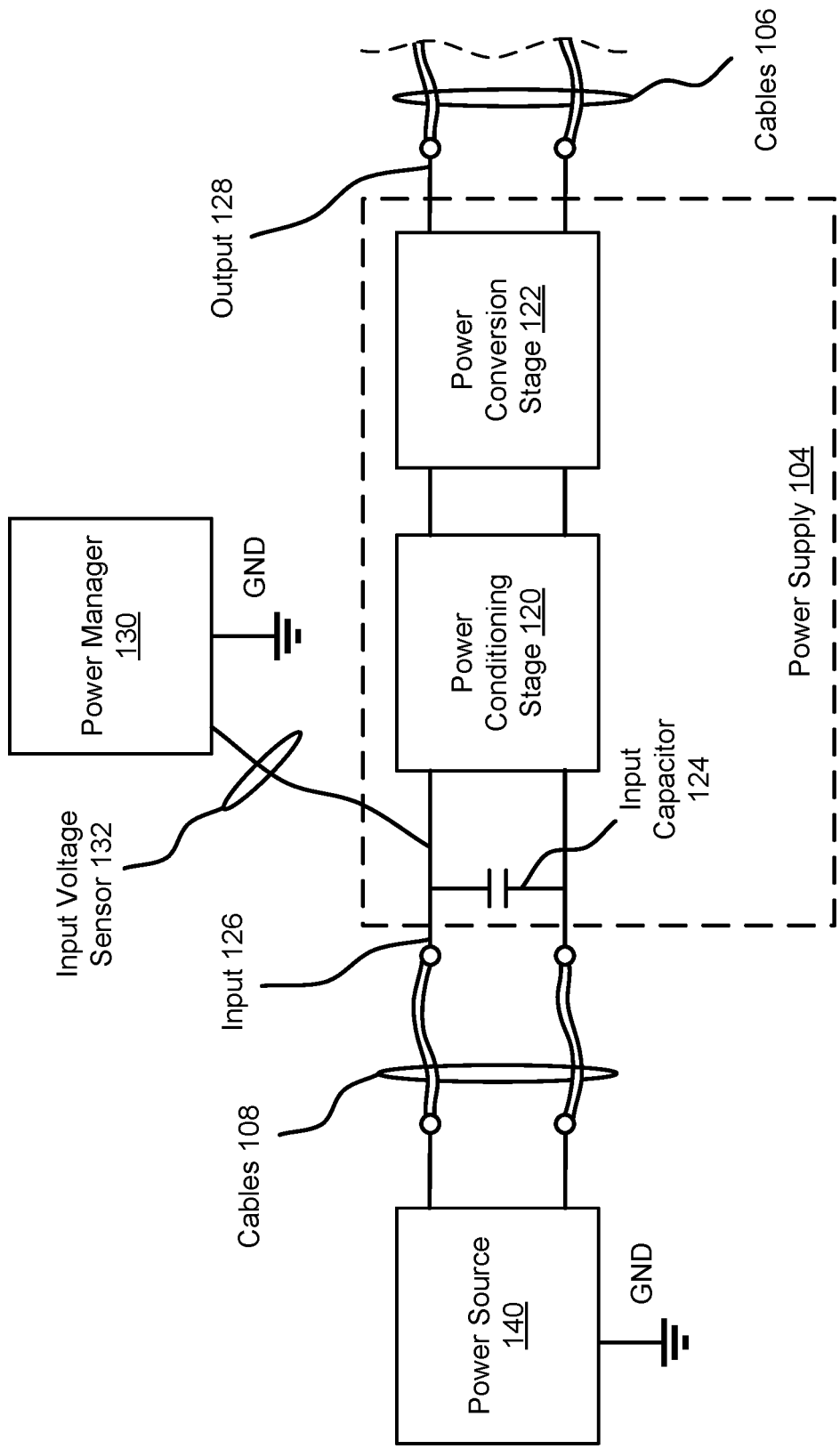
FIG. 1B shows a diagram illustrating a power supply in accordance with an embodiment.

When operating, power supply 104 may provide power to hardware resources 102 thereby allowing for operation of hardware resources 102. Power supply 104 may be implemented with any number of physical devices for conditioning power for use and managing the operation of power supply 104. Refer to FIG. 1B for additional details regarding power supply 104.

Enclosure 110 may include a physical structure for housing data processing system 100. The physical structure may be a form factor compliant structure such as, for example, a rack mount enclosure for a server. The physical structure may be other types of structures for housing data processing systems without departing from embodiments disclosed herein.

Enclosure 110 may include any number of sub-enclosures such as, for example, server chassis sleds, internal blocks, and/or other structures in which various portions of hardware resources 102 are positioned.

While power supply 104 is depicted in FIG. 1A as being positioned within enclosure 110, power supply 104 may be positioned in other locations (e.g., outside of enclosure 110) without departing from embodiments disclosed herein. For example, power supply 104 may be implemented as a rack-level power supply. Likewise, while illustrated with respect to a rack-type enclosure, enclosure 110 may be implemented with other form factors (e.g., blade enclosures, desk top enclosures, laptop enclosures, etc.) without departing from embodiments disclosed herein.

While the system of FIG. 1A has been illustrated as including a limited number of specific components, a system may include different numbers, types, and/or quantities of components without departing from the embodiments disclosed herein.

Turning to FIG. 1B, a schematic diagram of power supply 104 in accordance with an embodiment is shown.

As discussed above, power supply 104 may (i) obtain power from one or more power sources (e.g., 120), (ii) condition the power, and (iii) provide the conditioned power to hardware resources and/or other components. To provide this functionality, power supply 104 may include input 126, input capacitor 124, power conditioning stage 120, power conversion stage 122, and output 128. Each of these components is discussed below.

Input 126 may be implemented using terminals or other structures for receiving power from a power source (e.g., 120). Cables 108 may physically attach to the terminal to allow for an operable electrical connection to be formed. However, due to the nature of such connections, the connections between cables 108 and the terminals may temporarily fail and then be reestablished over time. Consequently, power supply 104 may be in an unpowered state for various periods of time even while cables 108 are physically connected to input 126. Similar issues regarding the physical connections between cables 108 and power source 140 may cause power supply 104 to be depowered for periods of time.

Input capacitor 124 may be implemented using a physical capacitor. Input capacitor 124 may perform waveform smoothing (e.g., to reduce the impact of power spikes from power source 140).

Power conditioning stage 120 may be implemented with one or more circuits (e.g., capacitors, inductors, resistors, transformers, active components such as transistors, etc.). The circuits may remove undesired spectral content from power received from power source 140 and/or otherwise condition the received power.

Power conversion stage 122 may be implemented with one or more circuits e.g., capacitors, inductors, resistors, transformers, active components such as transistors, etc.). The circuits may modify power received from power source 140 to meet voltage and/or current levels desired by consumers of power from power supply 104. The operation of power conversion stage 122 may be modifiable to adapt to different types of power being supplied by power source 140, and/or to manage depowering scenarios. For example, when depowering occurs, power conversion stage 122 may take action to gracefully depower consumers of its power, so long as the power conversion stage 122 is alerted to the depowering. Power conversion stage 122 may be alerted to depowering, and/or the type of power which is being supplied to it by power manager 130.

Output 128 be implemented using terminals or other structures for distributing power to power consumers. Cables 106 may physically attach to the terminal to allow for an operable electrical connection to be formed.

In an embodiment, power manager 130 is a part of power supply 104. Power manager 130 may be separate from power supply 104 without departing from embodiments disclosed herein.

Power manager 130 may identify a type of power (e.g., alternating current, direct current, depowered) being supplied by power source 140 and notify various components such as power conversion stage 122 of the type of power being supplied (and/or set operating states of the components based on the supplied power). By doing so, power manager 130 may improve the likelihood that power supply 104 matches it operation to the actual power being supplied to it by power source 140.

To ascertain the type of power being supplied by power source 140, power manager 130 may utilize input voltage sensor 132 to monitor the input voltage to power supply 104 from power source 140. This input voltage may be the voltage across input capacitor 124. Consequently, when power supply 104 becomes depowered, input capacitor 124 may discharge thereby causing the voltage measured by input voltage sensor 132 to appear to persist for a period of time even after power supply is depowered (e.g., intentionally or unintentionally due to disconnection of a connection necessary to maintain the operable connection between power source 140 and power supply 104).

Input voltage sensor 132 may be implemented using a voltage sensing circuit which may provide a representation of the input voltage to power manager 130, or may be implemented as an electrical connection which may allow a voltage sensor of power manager 130 to sample the input voltage.

Figure 2:
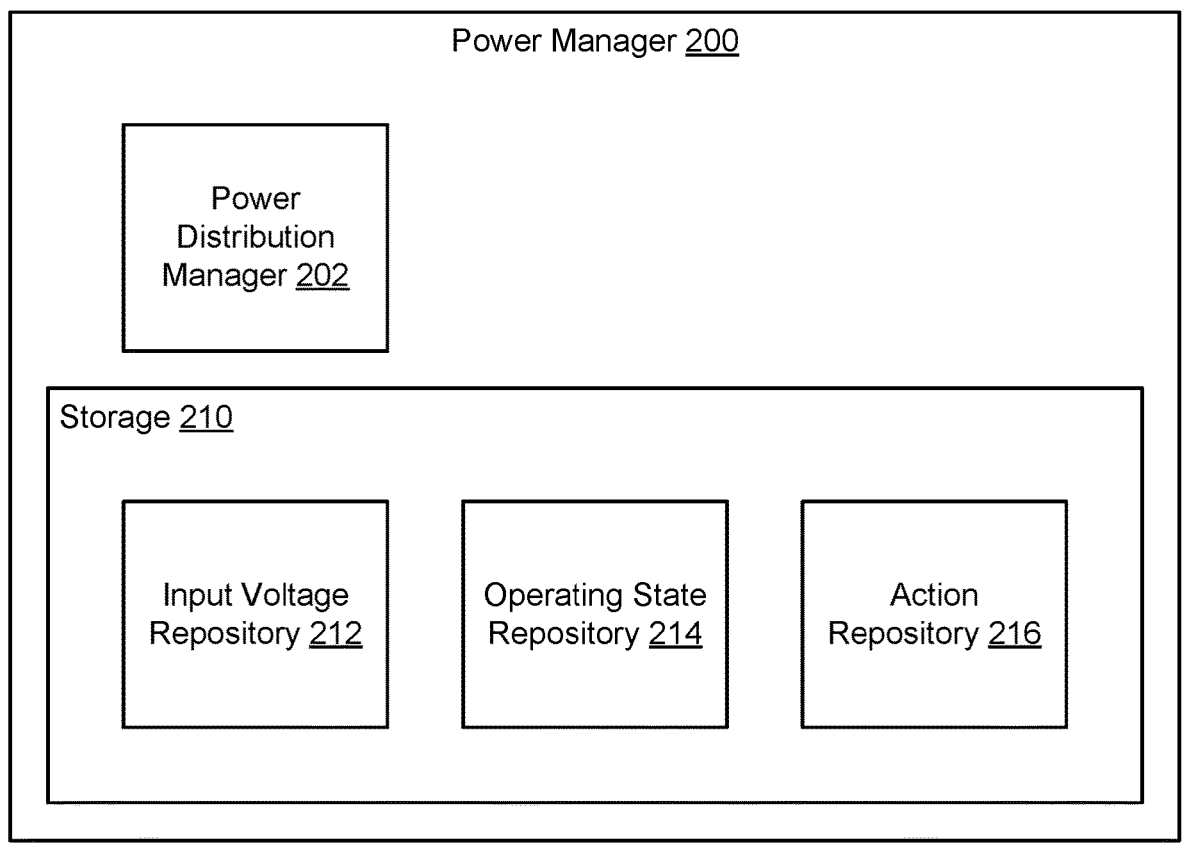
FIG. 2 shows a block diagram illustrating a power manager in accordance with an embodiment.

For additional details regarding power manager 130, refer to FIG. 2.

Power source 140 may be implemented with any type of power source which may provide any type of power.

While illustrated in FIG. 1B with a limited number of specific components, a power supply and/or system may include additional, fewer, and/or different components without departing from embodiments disclosed herein.

Turning to FIG. 2, a block diagram of power manager 200 in accordance with an embodiment is shown. As discussed above, power manager 200 may manage the operation of various components of power supply 104 based on the power being provided to power supply 104. Power manager 200 may be similar to power manager 130.

To provide its functionality, power manager 200 may include power distribution manager 202 and storage 210. Each of these components is discussed below.

Power distribution manager 202 may manage the distribution of power within and outside of power supply 104. To do so, power distribution manager 202 may (i) obtain information regarding the power being supplied to power supply 104, (ii) determine a type of power being supplied to power supply 104 based on the obtained information, and (iii) modify the operation of power supply based on the type of power being supplied to power supply if a change in the type of power being supplied to power supply has occurred. By doing so, power distribution manager 202 may improve the likelihood that power supply operates in a manner consistent with the power which it is being supplied. Consequently, the power supplied by power supply 104 may be more likely to match that expected by power consumers, and may also facilitate graceful depowering if necessary.

Power distribution manager 202 may manage the operation of other components using any command and control scheme. For example, power distribution manager 202 may invoke the functionalities of other components by applying analog voltages to them, by sending them digital data indicating invocation of their functionalities, and/or through other schemes (e.g., message passing, public-subscribe communication systems, synchronous/asynchronous operation, state machines, etc.).

In an embodiment, power distribution manager 202 is implemented using a hardware device including circuitry. The hardware device may be, for example, a digital signal processor, a field programmable gate array, or an application specific integrated circuit. The circuitry may be adapted to cause the hardware device to perform the functionality of power distribution manager 202. Power distribution manager 202 may be implemented using other types of hardware devices without departing embodiment disclosed herein.

In an embodiment, power distribution manager 202 is implemented using a processor adapted to execute computing code stored on a persistent storage that when executed by the processor performs the functionality of power distribution manager 202 discussed throughout this application. The processor may be a hardware processor including circuitry such as, for example, a central processing unit, a processing core, or a microcontroller. The processor may be other types of hardware devices for processing information without departing embodiment disclosed herein.

Figure 3A:
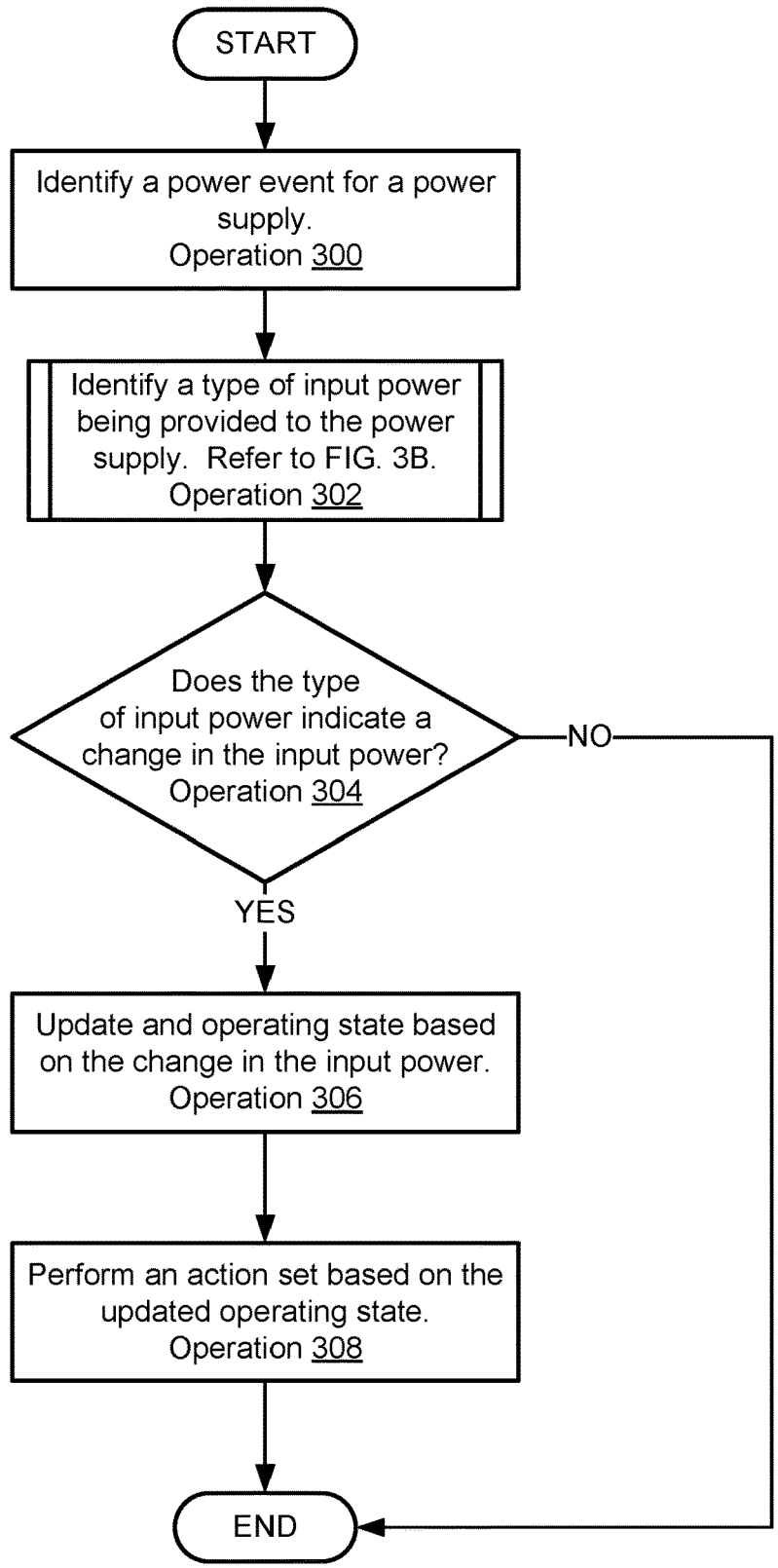
FIG. 3A shows a flow diagram illustrating a method of powering a data processing system in accordance with an embodiment.
Figure 3B:
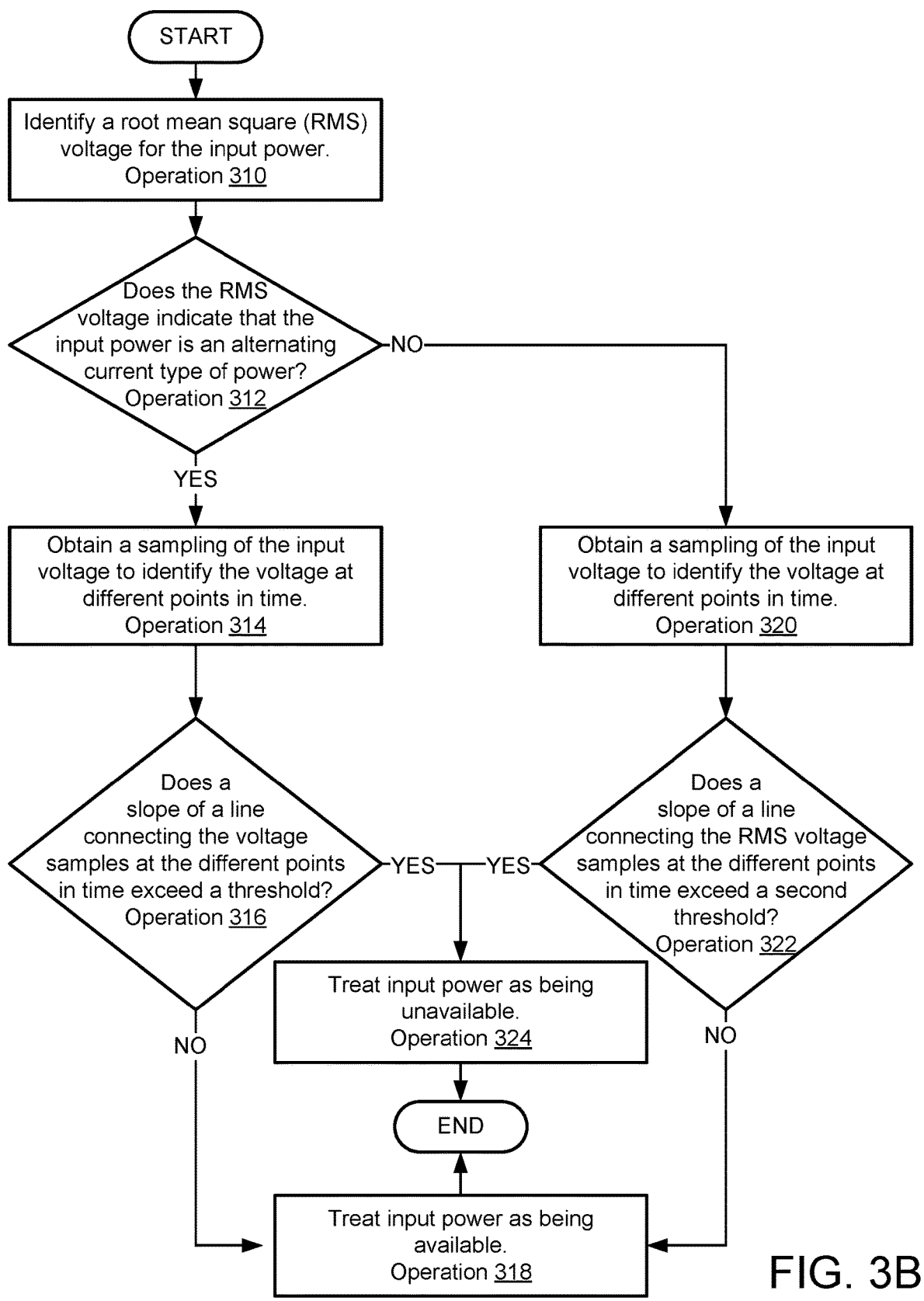
FIG. 3B shows a flow diagram illustrating a method of determining a type of power being provided to a power supply in accordance with an embodiment.

When providing its functionality, power distribution manager 202 may perform all, or a portion, of the methods illustrated in FIGS. 3A-3B as well as any of the actions, operation, etc. shown in FIGS. 4A-4I.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

In an embodiment, storage 210 is implemented with one or more registers in which values corresponding to thresholds/actions to be performed are stored.

In an embodiment, storage 210 is implemented with one or more circuits in which information is hard coded.

In an embodiment, storage 210 is implemented with programmable gate arrays, programmable read only memory, and/or other types of embedded storage devices.

Storage 210 may be implemented with other types of physical devices in which data may be stored without departing from embodiments disclosed herein.

Storage 210 may store data structures including input voltage repository 212, operating state repository 214, and/or action repository 216. Each of these data structures is discussed below.

Input voltage repository 212 may be implemented using one or more data structures that include information regarding the input voltage to power supply 104 over time. The repository may be updated over time as voltage measurements on the supplied power are performed. The information included in input voltage repository 212 may include one or more of: (i) raw voltage measurements, (ii) root mean square (RMS) measurements, (iii) time information (e.g., regarding when a measurement was performed), (iv) measurement sequence information (e.g., indicating an ordering of the voltage measurements), and/or (v) other information regarding voltage (or other quantities such as current/power) measurements related to the power supplied to power supply 104.

Operating state repository 214 214 may be implemented using one or more data structures that include information regarding the operating states of various components of power supply 104. The operating states may be modified over time based on the data stored in input voltage repository 212. For example, when the information in input voltage repository 212 indicates a change in power supplied to power supply, power distribution manager 202 may (i) modify the operating states of the components to complement the type of power supplied to power supply 104, (ii) distribute information regarding the changed operating states to the corresponding components (e.g., which may prompt changes in their operation to match the new operating states), and/or (iii) record the new operating states in operate state repository 214.

Action repository 216 may be implemented using one or more data structures that include information regarding actions to be performed based on the operating states of components of power supply 104. The actions may include, for example, (i) modifying how power conversion stages operate so that desired conditioned power continues to be provided to power consumers even when the power supplied to power supply 104 changes, (ii) gracefully depowering power consumers (e.g., when the power supply becomes depowered, and/or (iii) performing notifications regarding the change in supplied power (e.g., to administrators or other persons).

While various data structures have been illustrated and described in FIG. 2 with specific structures, any of the data structures may be implemented with different structures (e.g., lists, tables, linked lists, databases, etc.), stored in different locations, spanned across any number of devices, and/or may include additional, different, and/or less information without departing from embodiments disclosed herein.

While illustrated in FIG. 2 with a limited number of specific components, a power manager 200 may include additional, fewer, and/or different components without departing from embodiments disclosed herein.

While power manager 130 has been described with respect to programmable functionality, the functionality of power manager 130 may be implemented with (in part or entirely) circuits that perform equivalent functions and may not include or may include fewer programmable components.

As discussed above, the components of FIG. 1 may perform various methods to manage the power provided to data processing systems. FIGS. 3A-3B illustrate examples of methods that may be performed by the components of FIG. 1. In the diagrams discussed below and shown in FIGS. 3A-3B, any of the operations may be repeated, performed in different orders, and/or performed in parallel with or a partially overlapping in time manner with other operations.

Turning to FIG. 3A, a flow diagram illustrating a method of operating a data processing device to provide computer implemented services in accordance with an embodiment is shown. The method may be performed, for example, when power being supplied to a power supply of the data processing device may change in character (e.g., power type change or depowered).

At operation 300, a power event for a power supply of the data processing system is identified. The power event may be, for example, a power cycling, power-on, depowering, change in power type being obtained or other type of event that indicates that the power supply may need to modify its operation due to changes in supplied power. The power event may be identified, for example, based on changes in power to the power supply, based on information provided by other entities (e.g., a management entity of a host/client data processing system which may provide notifications regarding changes in power), or via other methods.

At operation 302, a type of input power being provided to the power supply is identified. The type of input power may be, for example, alternating current, direct current, or no power. As discussed above, the power source which may supply power to a power supply may change the type of power being supplied to the power supply, and/or the power supply may be temporarily depowered due to intentional and/or unintentional disconnection from the power source. Consequently, the type of input power being supplied to the power supply may change over time, and the changes may be intention or unintentional.

The type of input power may be identified, for example, by monitoring the voltage at the input to the power supply. However, due to the presence of capacitors, inductors, and/or other components, changes in the power supplied to the power supply may be difficult to discern based on the voltage at the input to the power supply immediately following a change in supplied power due to the energy storage characteristics of these components. To identify the input power, changes in the voltage at the input to the power supply over time may be identified and used to identify the actual type of power being provided to the power supply (e.g., before the capacitors and/or other components discharge). By doing so, the actual power being supplied to the power supply may be identified more quickly (e.g., then waiting for the power storing components to discharge thereby removing their impact/masking of the supplied power).

In an embodiment, the type of power is identified, at least in part, by ascertaining whether the input voltage falls below zero or goes negative. Such a voltage level may indicate the presence of alternating current at the input rather than direct current or a discharging capacitor.

In an embodiment, the type of input power is identified via the method illustrated in FIG. 3B. The type of input power may be identified via other methods without departing from embodiments disclosed herein.

At operation 304, it is determined whether the type of input power indicates a change in the input power to the power supply. The determination may be made, for example, by comparing the operating state of the power supply to an operating state in which the power supply should operate based on the identified type of the input power. If these operating states differ, then it may be determined that the type of the input power indicates a change in the input power to the power supply. In contrast, if these operating states are identical (or similar), then it may be determined that the type of the input power does not indicate a change in the input power to the power supply.

If it is determined that the type of the input power indicates a change in the input power to the power supply, then the method may proceed to operation 306. Otherwise the method may end following operation 304. Proceeding to operation 306 may indicate that the power supply believes that it may need to modify its operating state based on a new type of power being supplied to the power supply because its operating state is no longer appropriate for the new type of the power being supplied to the power supply.

At operation 306, the operating state of the power supply is updated based on the change in the input power. The operating state of the power supply may be updated by modifying operating state repository 214. For example, operating state repository 214 may be modified to indicate the updating operating state.

The updated operating state may be based on the type of the input power. For example, a table or other data structure may specify the operating state of the power supply based on the type of the input power being supplied to the power supply.

In an embodiment, the operating state may be updated, at least in part, by notifying other entities of the new operating state. For example, a chassis manager (not shown) or other entity tasked with managing the operation of a data processing system may be notified of the new operating state of the power supply. In turn, the chassis manage may notify other power management entities (e.g., such as a data center manager) which may allow for multi-data processing system power management and/or automated remediation of undesired power states.

At operation 306, an action set based on the updated operating state is performed. The action set may specify any number and types of actions to be performed to transition the power supply into the updated operating state. These actions may include, for example, modifying the operation of a power stage (e.g., to match the type of power being supplied to power supply that way appropriate conditioned power is provided to power consumers), performing a graceful depowering of power consumers (e.g., when the operating state is depowered or temporarily during transitions between alternating and direct current to reduce load on the power supply), sending notifications to management entities, and/or any other actions that may facilitate management of data processing systems during power transitions.

The actions of the action set may be specified by action repository 216. For example, action repository 216 may include a table with entries associated with different operating states. The entries may also specify corresponding actions. When the operating state of the power supply is updated, the entries corresponding to the updated operating state may be read and used as the actions of the action set.

The method may end following operation 308.

By performing the method illustrated in FIG. 3A, a data processing system and power supply thereof may be more likely to successfully provide computer implemented services by improving the likelihood that the power supply is able to provide desired conditioned power during and after changes in power supplied to it that would otherwise negatively impact the operation of the power supply. Thus, an improved computing device and power supply thereof that are better able to operate in varying environmental conditions may be provided.

Turning to FIG. 3B, a flow diagram illustrating a method of identifying a type of input power being provided to a power supply in accordance with an embodiment is shown.

At operation 310, a root mean square (RMS) voltage of the input power to the power supply is identified. The RMS voltage may be identified by measuring it with a sensor. The RMS voltage may be measured across an input capacitor of the power supply.

Other representations of the voltage of the input power may also and/or alternatively be obtained. For example, the input voltage may be monitored for negative voltage levels which may indicate that the input power is alternating current rather than direct current or disconnected entirely.

At operation 312, a determination is made regarding whether RMS voltage (and/or other obtained representations of the voltage) indicates that the input power is an alternating current type of power. The determination may be made based on the voltage level of the RMS voltage. For example, RMS voltages above a threshold may indicate that the input power is alternating current while RMS voltage levels below a threshold may indicate that the input power is direct current.

In another embodiment, the determination is made based on whether the voltage at the input goes negative.

If the RMS voltage (and/or negative voltage) indicates that the input power is alternating current, then the method may proceed to operation 314. Otherwise, the method may proceed to operation 320.

At operation 314, a sampling of the input voltage to the power supply at different points in time is obtained. The points in time may correspond to a period of time during which the input capacitor may be discharging thereby masking the type of the input power. The sampling of the input voltage may be obtained by measuring it with a sensor.

At operation 316, a determination is made regarding whether a slope of a line connecting the voltage samples at the different points in time exceed a threshold. For example, if the type of power supplied to the power supply is alternating current, then the voltage samples will be similar thereby resulting in a line with little to no slope. In contrast, if the power supply is actually depowered, the capacitor and/or other components may discharge which may result in a line connecting the voltage samples having a slope.

To make the determination, a counter may be initiated with a count of 0. As voltage samples are taken, each sample may be compared to the previous sample(s) to determine whether the sample is smaller in magnitude than the magnitudes of the previous sample(s) (e.g., immediately preceding, some number of preceding samples, all preceding samples, etc.). If the magnitude is smaller than the previous samples, the counter may be incremented (e.g., +1). If the magnitude is not smaller than the previous samples, the counter may be reset, decremented, or otherwise modified to indicate that additional data should be obtained to make the determination. The sampling process may continue until the count exceeds a threshold or the counter is not incremented for a threshold number (e.g., a count of 5) of samples.

If the count of the counter exceeds the threshold (e.g., a count of 5), then it may be determined that the slope of the line connecting the voltage samples at the different points in time exceeds the threshold. The threshold may be other threshold values (e.g., other than a count of five) without departing from embodiments disclosed herein.

If the slope of the line connecting the voltage samples at the different points in time exceeds the threshold, then the method may proceed to operation 324. Otherwise the method may proceed to operation 318.

At operation 318, the input power is treated as being available. In other words, the input power may be treated as being alternating current (e.g., by traversing to operation 318 from operation 312, and the operating state may be identified accordingly as being powered by alternating current.

The method may end following operation 318.

Returning to operation 316, the method may proceed to operation 324 following operation 316 if the slope of the line connecting the voltage samples at the different points in time does not exceed a threshold.

At operation 324, the input power is treated as being unavailable. In other words, even though the input voltage level measured at operation 312 may be high enough to indicate that alternating current may be being supplied to the power supply, the slope of the line of operation 316 may indicate that no power is being supplied and that discharge of capacitors and/or other components are masking the lack of supplied power. Consequently, the operating state may be identified as unpowered.

The method may end following operation 324.

Returning to operation 312, the method may proceed to operation 320 following operation 312 when it is determined that the RMS voltage indicates that the input power is not alternating current type of power.

At operation 320, a sampling of the input voltage is obtained to identify the voltage at different points in time. The sampling may be performed similarly to that described with respect to operation 314.

At operation 322, a determination is made regarding whether a slope of a line connecting the voltage samples at the different points in time exceed a threshold. For example, if the type of power supplied to the power supply is alternating current, then the voltage samples will be similar thereby resulting in a line with little to no slope. In contrast, if the power supply is actually depowered, the capacitor and/or other components may discharge which may result in a line connecting the voltage samples having a slope. The determination may be made similarly to that discussed with respect to operation 316.

If the slope of the line connecting the voltage samples at the different points in time exceeds the threshold, then the method may proceed to operation 324. Otherwise the method may proceed to operation 318. As discussed above, the method may end following operations 318 and 324.

Using the method illustrated in FIG. 3B, a type of power being supplied to a power supply may be more likely to be accurate determined, thereby allowing corresponding operation of various components to be set. Consequently, the components of the data processing system that provide the computer implemented services may be more likely to receive conditioned power for their operation.

Turning to FIGS. 4A-4I, diagrams illustrating operation of a system similar to that shown in FIGS. 1A-1B in accordance with an embodiment are shown. In FIGS. 4A-4I, operations performed by the respective components are highlighted with numbered circular elements superimposed on the components performing the operations. Interactions between components are illustrated using arrows with dashed tails.

Now, consider an example scenario in which a data processing system includes power supply 104 which receives power from power source 140 and supplies power to hardware resources (not shown). During a first period of time, power source 140 is operably connected to the power supply via cables 108 and supplies alternating current to the power supply.

Figure 4A:
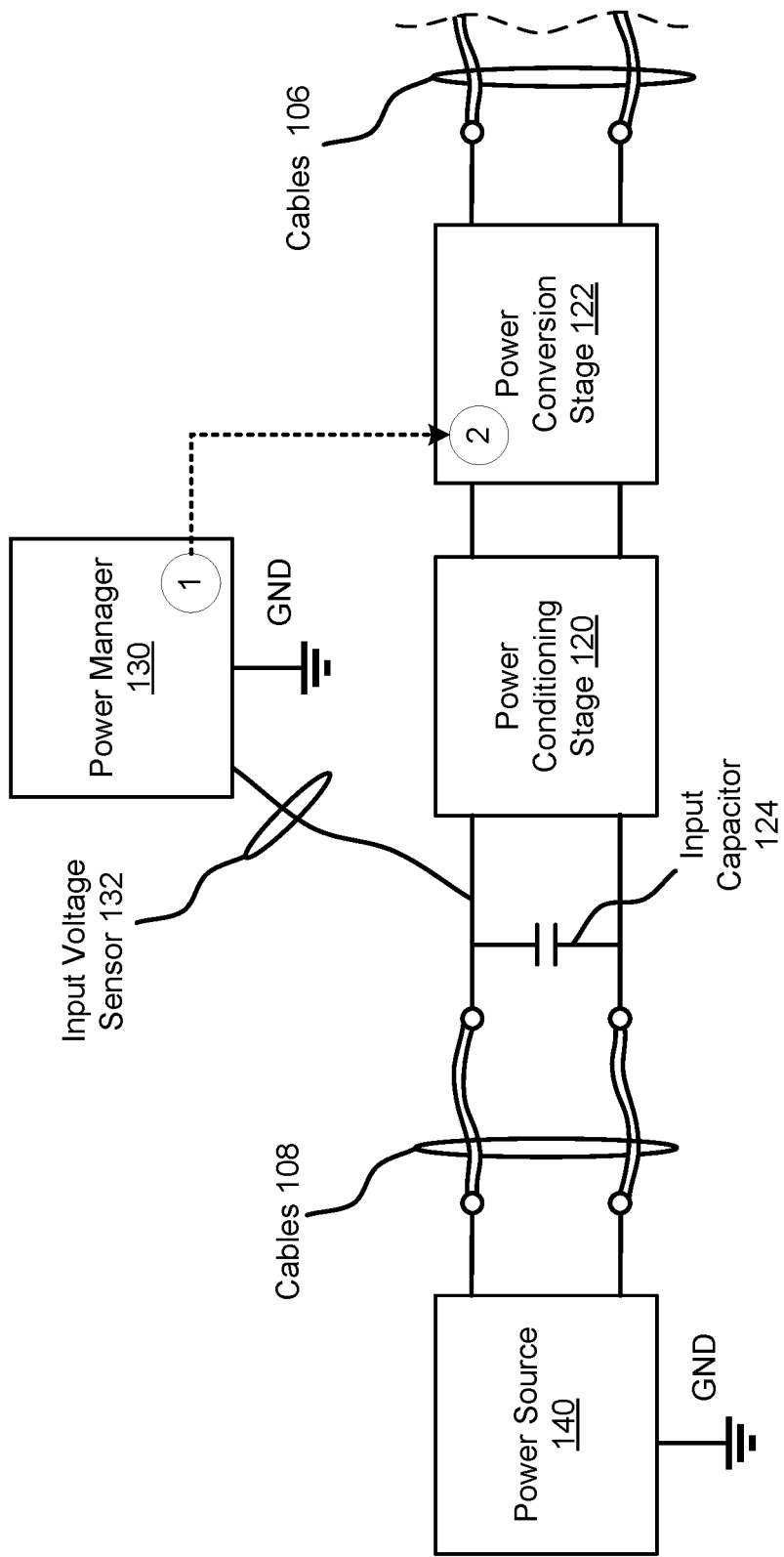
FIGS. 4A-4I show diagrams illustrating a process performed by an example system in accordance with an embodiment.
Figure 4B:
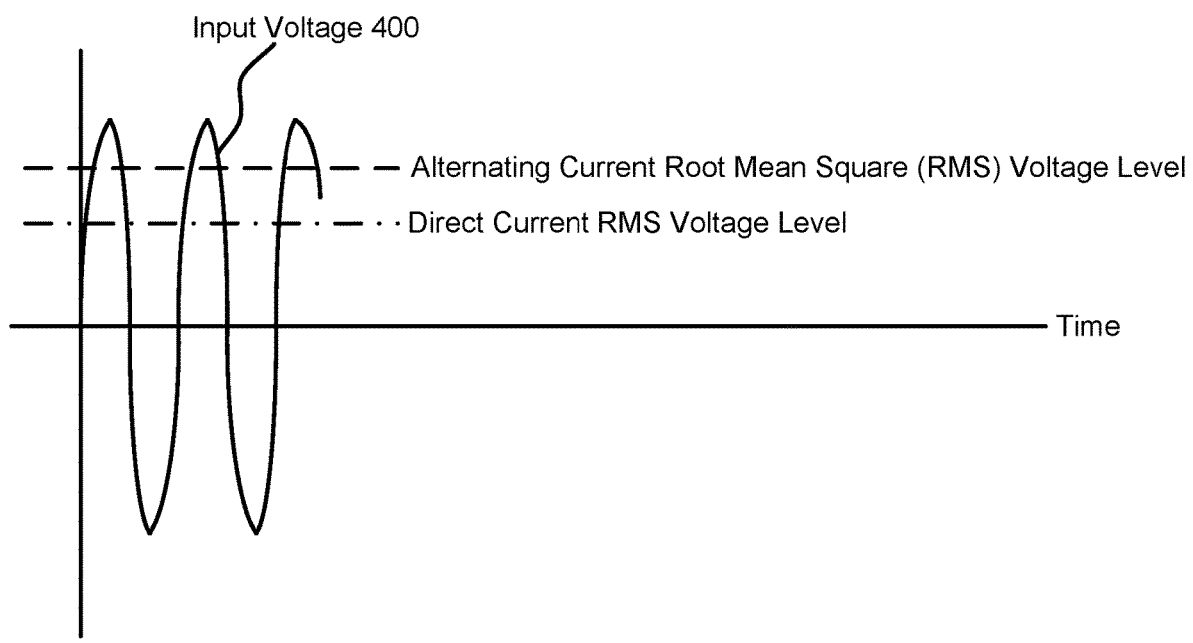

Turning to FIG. 4B, a diagram of an example of the input voltage (e.g., across input capacitor 124) in accordance with an embodiment is shown. In FIG. 4B and similar FIGS. 4D, 4E, and 4H, Time is indicated from left to right in the figure and the amplitude of the input voltage is indicated from top to bottom of the page.

As seen in FIG. 4B, input voltage 400 alternates for a period of time. The RMS voltage levels corresponding to alternating current and direct current are superimposed in FIG. 4B.

Returning to the discussion of FIG. 4A, to ascertain how the power supply should operate, power manager 130 measures the RMS input voltage and/or input voltage over time. In this case, because the power supply is receiving alternating current, the measured RMS input voltage is nearly the same as that illustrated in FIG. 4B and the input voltage periodically goes negative thereby indicating that alternating current rather than other types of power is present.

Based on the determination, power manager 130 sets the operating state of the power supply accordingly. Based on the updated operating state, at operation 1, power manager 130 instructs power conversion stage 122 to perform a power conversion process for converting alternating current to conditioned power. In response, at operation 2, power conversion stage 122 modifies its operation accordingly, thereby beginning the supply of conditioned power to hardware resources via cables 106.

Figure 4C:
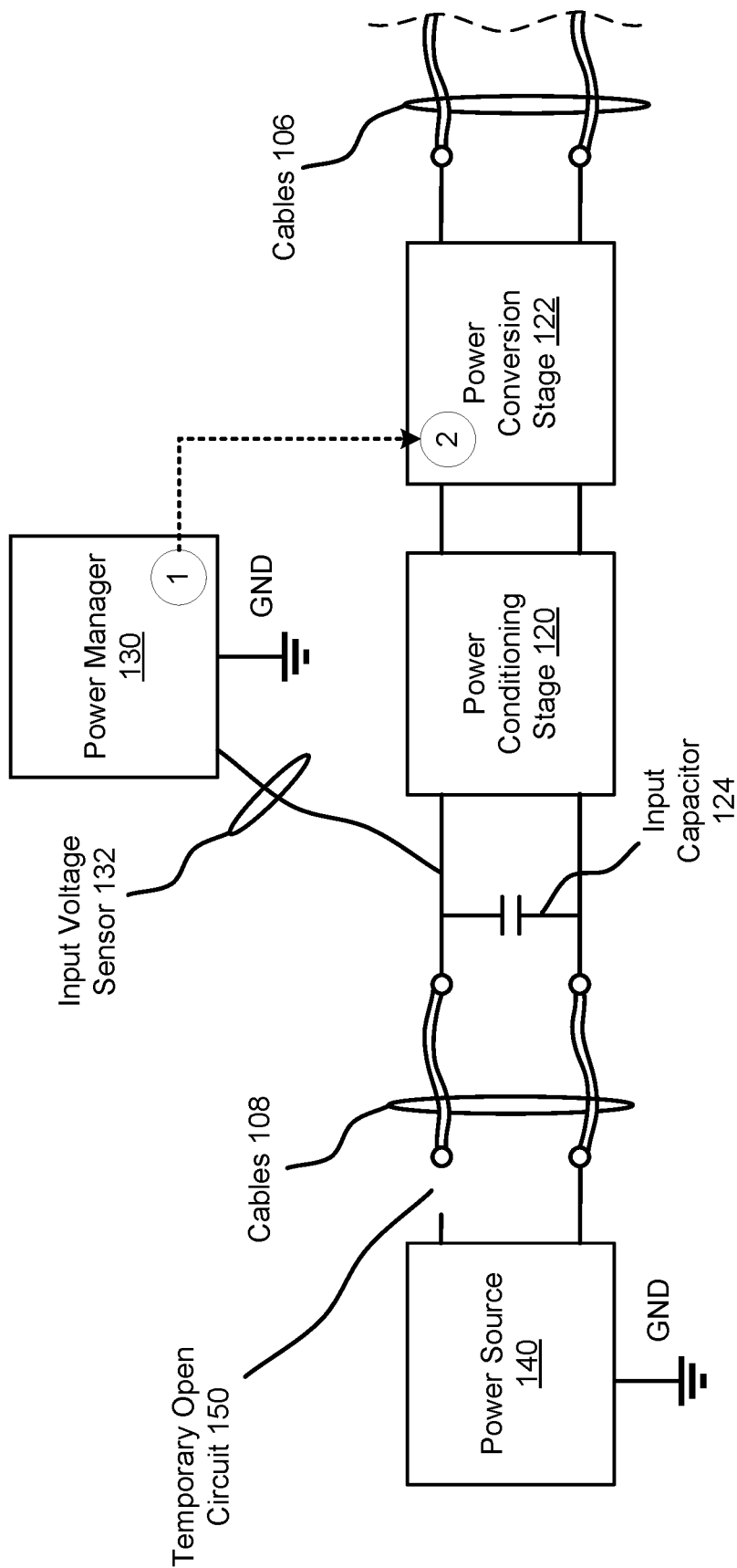

Now consider a scenario where, at a later point in time, an open circuit occurs between power source 140 and the power supply, as illustrated in FIG. 4C. Turning to FIG. 4C, a diagram of a power supply in accordance with an embodiment is shown. As seen, temporary open circuit 150 has occurred between cables 108 and power source 140. In FIG. the temporary open circuit is indicated by the distance between the depiction of one end of cables 108 and power source 140. However, in practice the open circuit could occur without being visible to a person proximate to power source 140 and/or cables. As used herein, an open circuit refers to an electrical state in which the resistance between two components rises so substantially that the flow of current is reduced (in some cases, substantially stopped while in other cases may be greatly reduced). Such open circuit could occur, for example, due to the formation of an air gap between two conductive components (e.g., cables 108 and other conductors such as terminals to which cables 108 may attach), tarnish formed on interfaces (e.g., between cables and terminals), and/or other processes.

When temporary open circuit 150 is formed, power from power source 140 stops flowing. However, input capacitor 124, power conditioning stage 120, and/or other components may be in a charged state. Consequently, they may begin to discharge thereby causing the input voltage of the power supply to not immediately drop to zero.

Figure 4D:
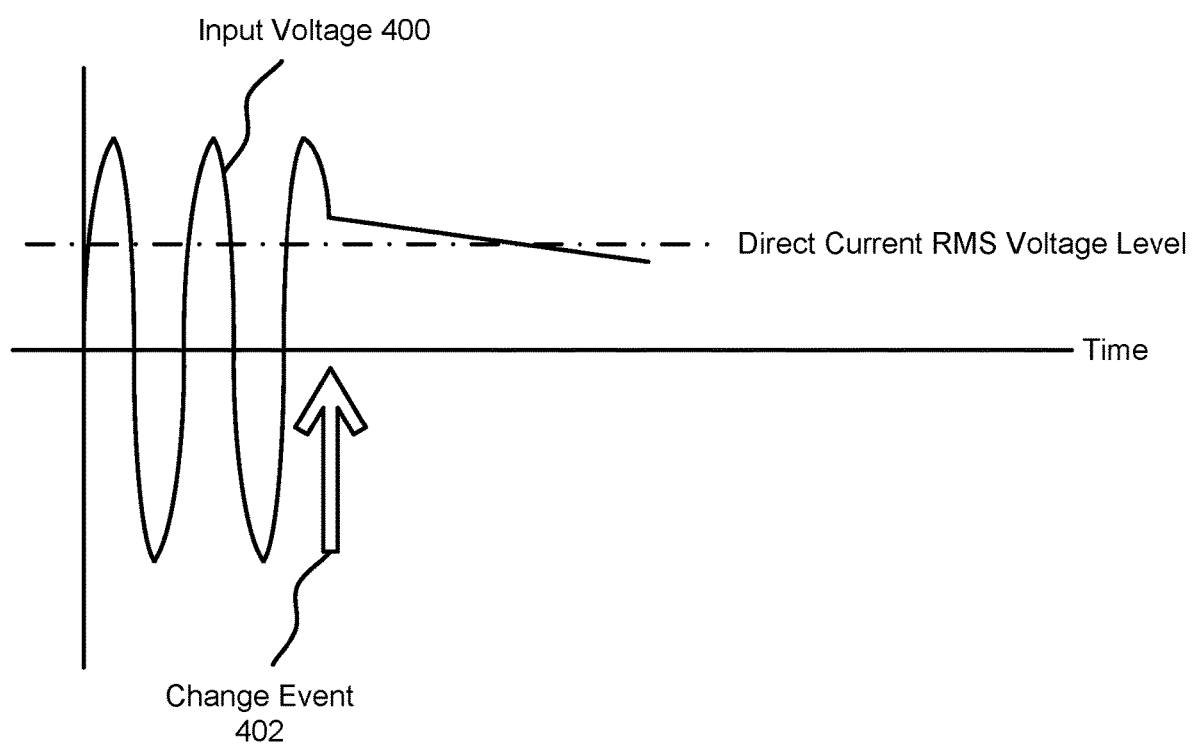

Turning to FIG. 4D, a second diagram of the example of the input voltage (e.g., across input capacitor 124) in accordance with an embodiment is shown. In FIG. 4D, the point in time at which the power supply becomes disconnected from the power source by virtue of the open circuit is highlighted by change event 402. Following change event 402, the charged components begin to discharge thereby causing the input voltage to decrease over time. However, if the RMS voltage is calculated for this portion of the input voltage, the value may be similar to that of the RMS voltage when direct current power is being supplied to the power supply. Consequently, if only the RMS voltage is taken into consideration, the power manager may incorrectly determine that the power supply is being supplied with direct current rather than actually being depowered.

Figure 4E:
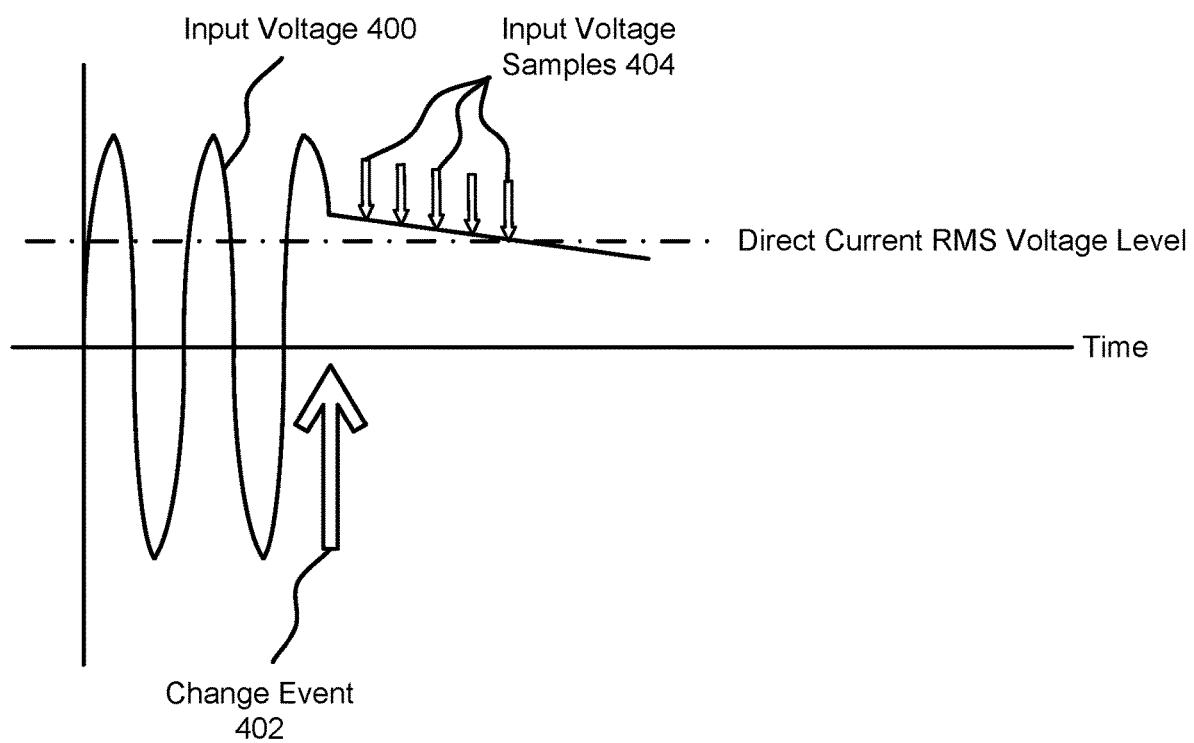

To facilitate proper detection of the type of power being supplied to the power supply, the power manager may sample the input voltage at points in time following change event 402. Turning to FIG. 4E, a third diagram of the example of the input voltage (e.g., across input capacitor 124) in accordance with an embodiment is shown. As seen in FIG. 4E, input voltage samples 404 may be taken at various points in time following event 402. In a case where the power supply is unpowered, the resulting subsequent samples may generally have reduced magnitudes when compared to the preceding samples. Consequently, by sampling the voltage over time, the power manager may determine whether the power supply is actually powered or unpowered.

Figure 4F:
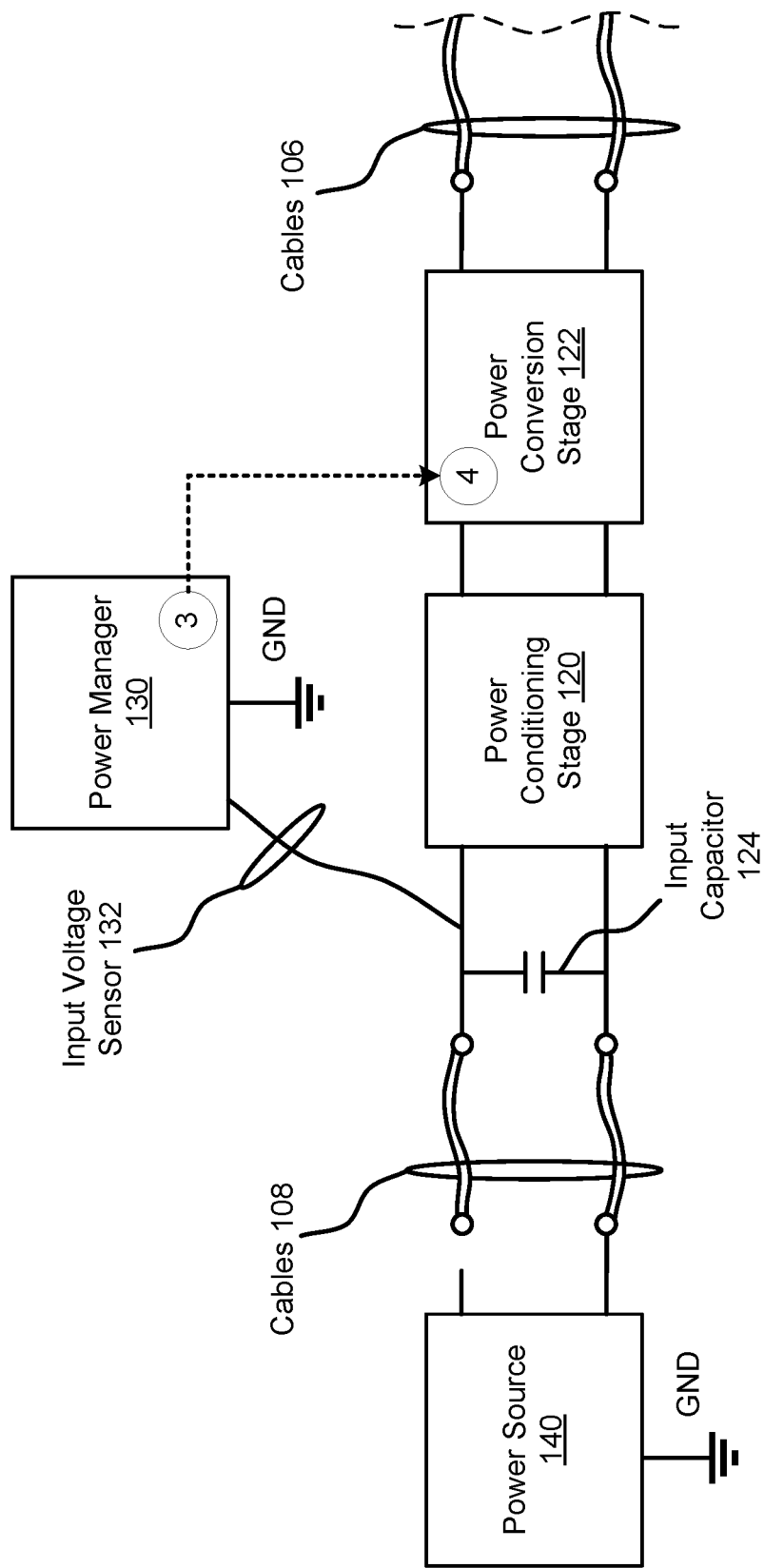

Turning to FIG. 4F, after the power manager 130 determines that the power supply is unpowered, at operation 3, the operating state for the power supply may be updated. Once updated, the power manager 130 may perform an action set to ensure that power conversion stage 122 is operating in accordance with the new operating state. For example, power manager 130 may indicate that power conversion stage 122 is to perform a graceful depowering of power consumers (not shown) of the conditioned power that it provides.

Figure 4G:
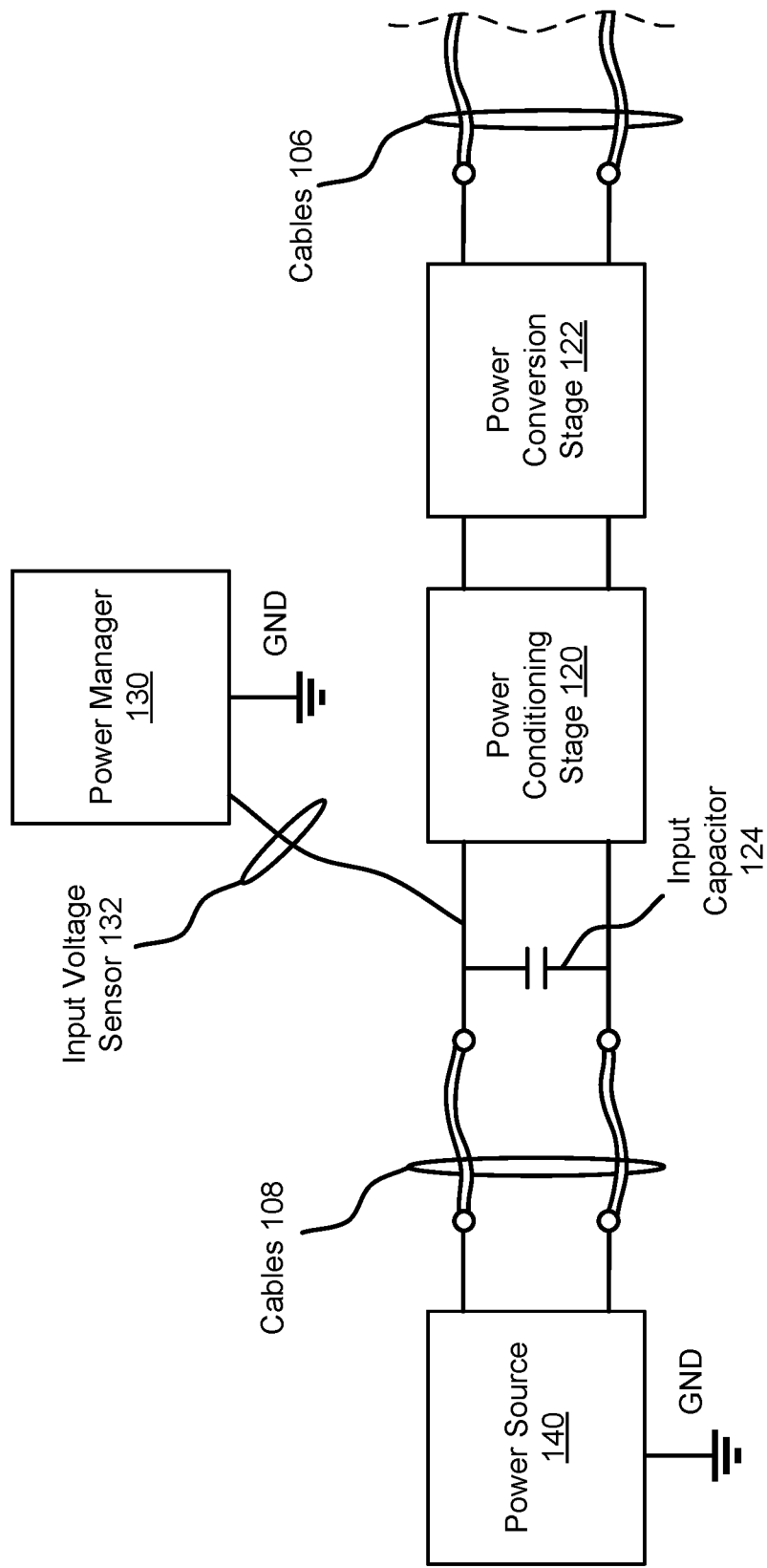

Now, consider a scenario where the open circuit is reconnected (e.g., by natural movement) and power source 140 switches from providing AC current to DC current, as shown in FIG. 4G. In such a scenario, power manager 130 may identify that a new power event has occurred and may begin to sample the input voltage.

Figure 4H:
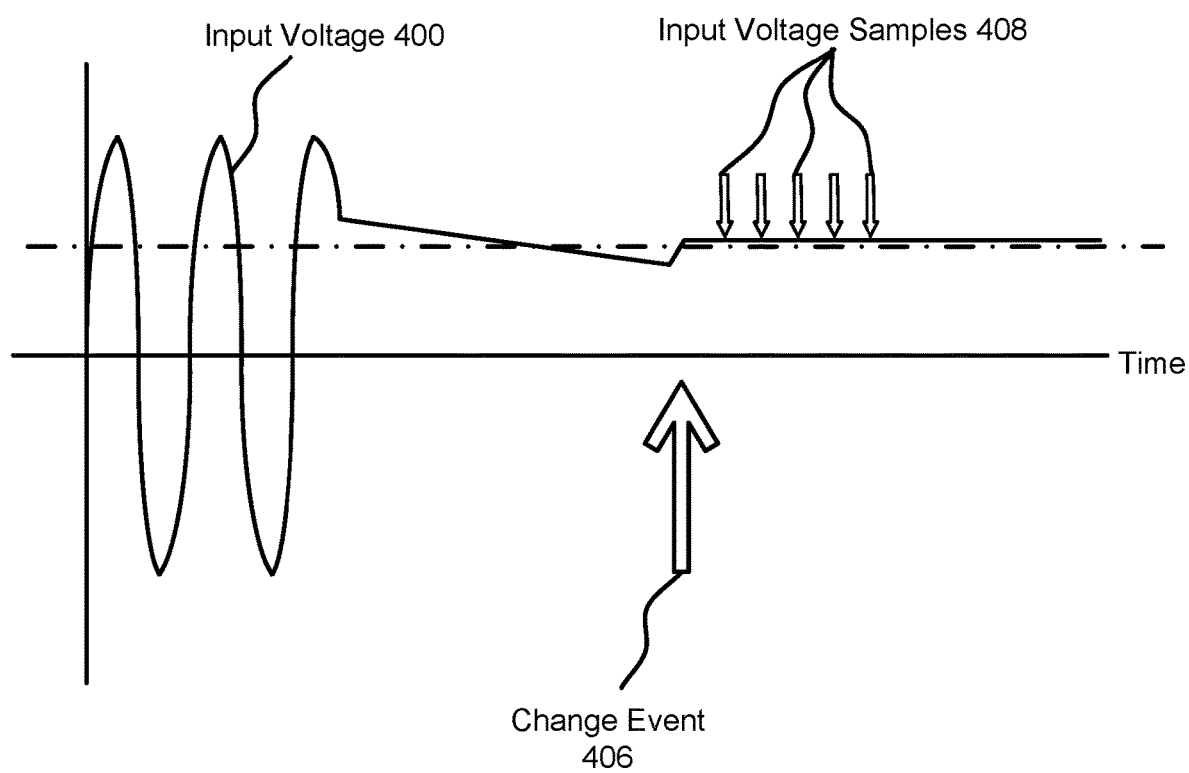

Turning to FIG. 4H, a fourth diagram of the example of the input voltage (e.g., across input capacitor 124) in accordance with an embodiment is shown. As seen in FIG. 4H, following change event 406 (which corresponds to when the power supply is repowered with direct current), the input voltage may stabilize. Input voltage samples 408 may be taken at various points in time following change event 406. By sampling the voltage over time, the power manager may determine whether the power supply is powered with direct current because the voltage samples do not indicate a pattern of reduced magnitude over time.

Figure 4I:
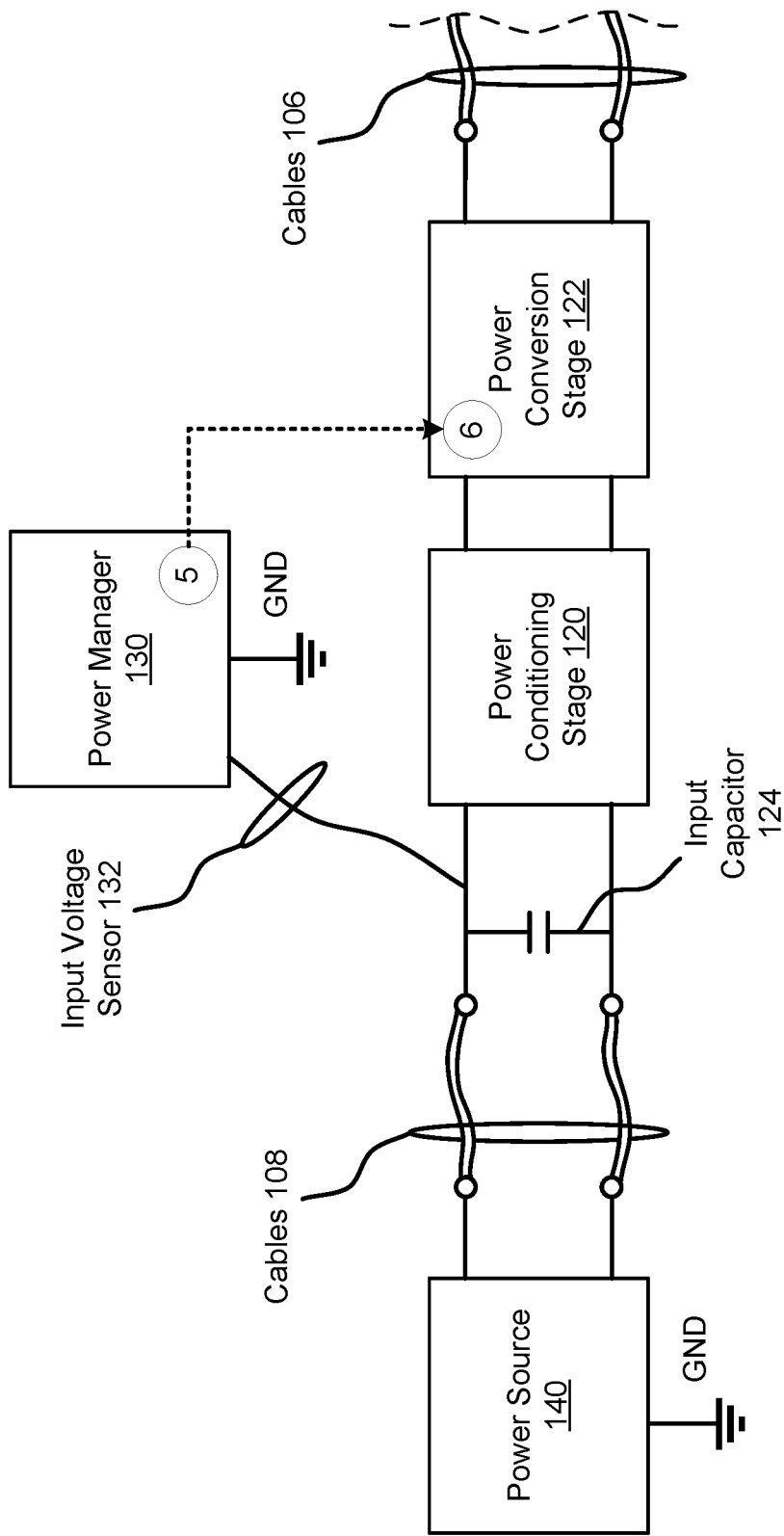

Turning to FIG. 4I, after the power manager 130 determines that the power supply is powered with direct current, at operation 5, the operating state for the power supply may be updated. Once updated, power manager 130 may perform a second action set to ensure that power conversion stage 122 is operating in accordance with the new operating state. For example, power manager 130 may indicate that power conversion stage 122 is to perform operate in a manner consistent with providing conditioned power using direct current power (e.g., via voltage level step downs rather than rectification and step down, which may be used to condition alternating current into conditioned power).

Thus, as illustrated in FIGS. 4A-4I, a data processing system and/or power supply thereof may automatically identify changes in supplied power and take appropriate action. By doing so, power consumers may be more likely to receive conditioned power which may reduce component damage (e.g., due to be supplied power that is not properly conditioned), improve system update, and/or provide other benefits.

Figure 5:
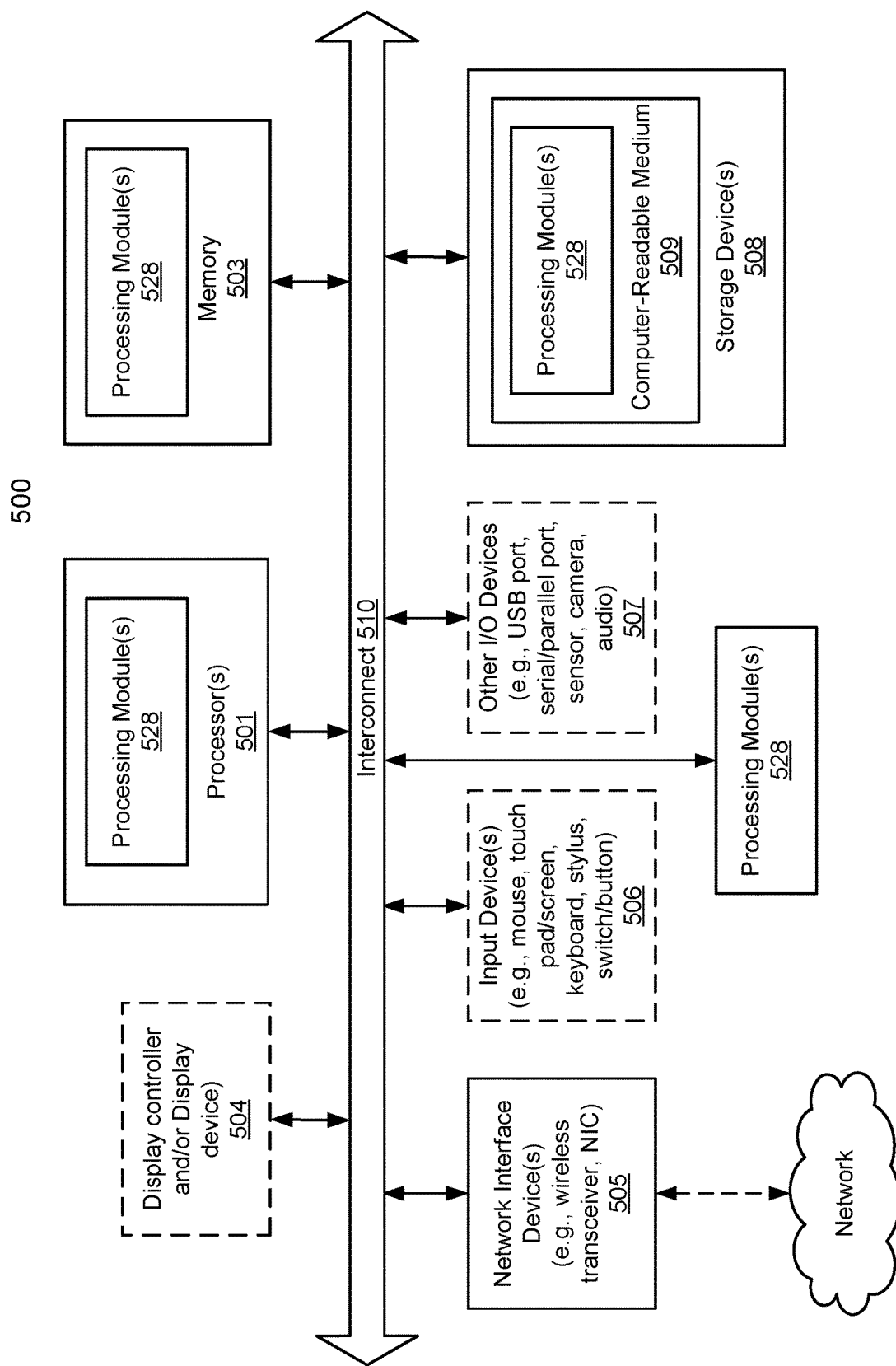
FIG. 5 shows a block diagram illustrating a data processing system in accordance with an embodiment.

Any of the components illustrated in FIGS. 1A-4I may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments of the invention as described herein.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A power supply for powering a data processing system comprising hardware resources to provide computer implemented services, the power supply comprising:
   an input for receiving power from a power source;
   a power stage that provides power to the hardware resources;
   an input capacitor positioned with the input; and
   a power manager adapted to:
   identify a power event for the power supply based on monitoring of an input voltage across the input capacitor from the power source;
   in response to identifying the power event, identify a type of input power being provided to the power supply based on a sampling of the input voltage across the input capacitor over a period of time at least by:
   identifying a root mean square (RMS) voltage for the input power from the power supply;
   sampling the input voltage for the input power from the power supply over a period of time;
   identifying a slope of a line connecting the input voltage samples over the period of time; and
   making a determination regarding whether the slope exceeds a threshold;
   when the type of input power indicates a change in power provided by the power supply:
   update an operating state of the power supply based on the change in the power provided by the power supply, and
   perform an action set based on the updated operating state to modify operation of the power supply; and
   when the type of input power does not indicate the change in power provided by the power supply:
   maintain the operating state of the power supply.

2. The power supply of claim 1, wherein identifying the type of input power being provided to the power supply further comprises:
   when the slope exceeds the threshold, identifying that the type of input power is unpowered; and
   when the slope does not exceed the threshold, identifying that the type of input power is alternating current or direct current.

3. The power supply of claim 2, wherein the type of input power is identified as alternating current when the RMS voltage exceeds a second threshold and the type of input power is identified as direct current when the RMS voltage does not exceed the second threshold.

4. The power supply of claim 2, wherein the threshold is a negative number.

5. The power supply of claim 1, wherein identify the type of input power being provided to the power supply comprises:
   obtaining a series of samples of the input voltage for the input power from the power supply;
   for each sample of the series of samples, determining whether the respective sample is of a lower value than an immediately preceding sample in the series of samples; and
   based on the determinations:
   incrementing a counter when the respective sample is of the lower value than the immediately preceding sample in the series of samples,
   resetting the counter when the respective sample is of the lower value than the immediately preceding sample in the series of samples,
   determining that the power type is unpowered when the counter exceeds a threshold, and
   determining that the power type is direct current or alternating current when the counter does not exceed the threshold and all of the determinations have considered.

6. The power supply of claim 1, wherein the input capacitor is directly connected to the input.

7. The power supply of claim 6, wherein an input voltage sensor of the power manager is placed between the input capacitor and the power stage to monitor the input voltage across the input capacitor.

8. A data processing system to provide computer implemented services, the data processing system comprising:
   hardware resources used to provide the computer implemented services;
   a power supply comprising:
   an input for receiving power from a power source;
   a power stage that provides power to the hardware resources;
   an input capacitor positioned with the input; and
   a power manager adapted to:
   identify a power event for the power supply based on monitoring of an input voltage across the input capacitor from the power source;

in response to identifying the power event, identify a type of input power being provided to the power supply based on a sampling of the input voltage across the input capacitor over a period of time at least by:
  identifying a root mean square (RMS) voltage for the input power from the power supply;
  sampling the input voltage for the input power from the power supply over a period of time;
  identifying a slope of a line connecting the input voltage samples over the period of time; and
  making a determination regarding whether the slope exceeds a threshold;
when the type of input power indicates a change in power provided by the power supply:
  update an operating state of the power supply based on the change in the power provided by the power supply, and
  perform an action set based on the updated operating state to modify operation of the power supply; and
when the type of input power does not indicate the change in power provided by the power supply:
  maintain the operating state of the power supply.

9. The data processing system of claim 8, wherein identifying the type of input power being provided to the power supply comprises:
when the slope exceeds the threshold, identifying that the type of input power is unpowered; and
when the slope does not exceed the threshold, identifying that the type of input power is alternating current or direct current.

10. The data processing system of claim 9, wherein the type of input power is identified as alternating current when the RMS voltage exceeds a second threshold and the type of input power is identified as direct current when the RMS voltage does not exceed the second threshold.

11. The data processing system of claim 9, wherein the threshold is a negative number.

12. The data processing system of claim 8, wherein identify the type of input power being provided to the power supply comprises:
obtaining a series of samples of the input voltage for the input power from the power supply;
for each sample of the series of samples, determining whether the respective sample is of a lower value than an immediately preceding sample in the series of samples; and
based on the determinations:
  incrementing a counter when the respective sample is of the lower value than the immediately preceding sample in the series of samples,
  resetting the counter when the respective sample is of the lower value than the immediately preceding sample in the series of samples,
  determining that the power type is unpowered when the counter exceeds a threshold, and
  determining that the power type is direct current or alternating current when the counter does not exceed the threshold and all of the determinations have considered.

13. The data processing system of claim 8, wherein the action set comprises:
modifying operation of a power stage of the power supply, the operation of the power supply controlling a type and quantity of processed power provided to the hardware resources.

14. The data processing system of claim 8, wherein the action set comprises:
performing a graceful depowering of the hardware resources when the operating state is unpowered.

15. A method of operating hardware resources of a data processing system to provide computer implemented services, the method comprising:
identifying a power event for a power supply that supplies power to the hardware resources, the power event being identified based on monitoring of an input voltage across an input capacitor from a power source of the power supply, the power supply receiving power from the power source via the input capacitor;
in response to identifying the power event, identifying a type of input power being provided to the power supply based on a sampling of the input voltage across the input capacitor over a period of time at least by:
  identifying a root mean square (RMS) voltage for the input power from the power supply;
  sampling the input voltage for the input power from the power supply over a period of time;
  identifying a slope of a line connecting the input voltage samples over the period of time; and
  making a determination regarding whether the slope exceeds a threshold;
when the type of input power indicates a change in power provided by the power supply:
  updating an operating state of the power supply based on the change in the power provided by the power supply, and
  perform an action set based on the updated operating state to modify operation of the power supply; and
when the type of input power does not indicate the change in power provided by the power supply:
  maintaining the operating state of the power supply.

16. The method of claim 15, wherein identifying the type of input power being provided to the power supply further comprises:
when the slope exceeds the threshold, identifying that the type of input power is unpowered; and
when the slope does not exceed the threshold, identifying that the type of input power is alternating current or direct current.

17. The method of claim 16, wherein the type of input power is identified as alternating current when the RMS voltage exceeds a second threshold and the type of input power is identified as direct current when the RMS voltage does not exceed the second threshold.

18. The method of claim 16, wherein the threshold is a negative number.

19. The method of claim 15, wherein identify the type of input power being provided to the power supply comprises:
obtaining a series of samples of the input voltage for the input power from the power supply;
for each sample of the series of samples, determining whether the respective sample is of a lower value than an immediately preceding sample in the series of samples; and
based on the determinations:
  incrementing a counter when the respective sample is of the lower value than the immediately preceding sample in the series of samples,
  resetting the counter when the respective sample is of the lower value than the immediately preceding sample in the series of samples,
  determining that the power type is unpowered when the counter exceeds a threshold, and determining that the power type is direct current or alternating current when the counter does not exceed the threshold and all of the determinations have considered.

20. The method of claim 15, wherein the action set comprises:
modifying operation of a power stage of the power supply, the operation of the power supply controlling a type and quantity of processed power provided to the hardware resources.

\* \* \* \* \*